Patented Dec. 26, 1950

2,535,852

UNITED STATES PATENT OFFICE 2,535,852

ADHESIVE COMPOSITION COMPRISING A ROSIN ALCOHOL AND A BUTADIENE-ACRYLONITRILE COPOLYMER

Arch L. Hatfield and Harold P. Owen, Maple Heights, Ohio, assignors to The B. F. Goodrich Company, New York, N. Y., a corporation of New York No Drawing. Application July 7, 1950,
Serial No. 172,616

4 Claims. (Cl. 260—27)

The present invention relates generally to adhesive compositions for the production of pressure-sensitive coatings and more specifically to an adhesive composition comprising an aqueous dispersion of adhesive materials which when deposited on a backing member will form a cohesive, oil-resistant coating evidencing little incipient tack or adhesion to other surfaces but which when subjected to slight pressure has excellent adhesion to a like coated member or surface and which will retain its adhesiveness to itself and its backing member at both high and low temperatures.

It is well known that rubber-like materials, particularly natural rubber in latex form, are utilized as base materials in pressure-sensitive adhesives. Combinations of starch, dextrin and other carbohydrate materials with natural and synthetic rubbers have also been utilized in adhesives. However, such adhesives suffer from many disadvantages which limit their use such as sensitivity to water, lack of resistance to oil, high and low temperatures and resistance to oxidation and discoloration, limited adhesion to the base member such that only a limited number of reseals may be made before the adhesive layer separates from the base member.

One of the most useful applications of the above type of adhesives is the provision of a pressure-sensitive adhesive coating on wax paper, paper tape, metallic foil, cellophane, glassine paper, and other like materials used in the production of packages for bread, candy, cigarettes and tobacco and for food wrapping and packaging in general. Since these materials dry out or go "stale" when exposed to the air it would be highly advantageous if the consumer could open the package, remove what he desires, and then reseal the package merely by finger pressure. The above-mentioned defects of known adhesives make it impossible to reseal the adhesive bond, once it is broken, either because the package itself must be destroyed in opening it or because breaking of the adhesive bond destroys the adhesive layer. Moreover, packaging materials coated with such adhesives lose their adhesion in storage. The natural rubber adhesives when utilized as a sealer coating for wax-coated papers have the additional defect of losing their adhesive powers in contact with a wax-coated surface during storage.

We have discovered that a superior adhesive is produced from a soft, low molecular weight polymer of a butadiene-1,3 hydrocarbon and an acrylic nitrile, upon the addition thereto of minor amounts of an emulsified rosin alcohol such as dehydroabietyl alcohol, dihydroabietyl alcohol, tetrahydroabietyl alcohol and others or mixtures of these and similar alcohols. The resulting aqueous dispersion is an excellent pressure sensitive adhesive which when coated on paper, cardboard, wax paper, glassine paper, aluminum, lead and other metal foils, cellophane, vinyl resin films and sheets, glass, and other packaging materials and on other surfaces where a quick and easy seal (to a like-coated surface) is desired. The adhesive coating is easily applied and requires only air drying to acquire its extraordinary adhesive properties which include the unique property of excellent adhesion to the backing surface but after being once deposited and dried it evidences little adhesive attraction for anything but another similarly coated surface, it will retain its adhesiveness in contact with wax paper (a property possessed by few adhesive materials, especially those containing a rubbery material since rubbery materials are usually compatible with waxes), it retains its adhesiveness at both low and high temperatures, and will so tenaciously adhere to its base stock or member that numerous resealing operations (10 or more) are possible.

The rubbery materials for use in our adhesive comprise the soft, low molecular weight polymeric products of the polymerization of a butadiene-1,3 hydrocarbon such as butadiene-1,3, isoprene, 2,3-dimethyl butadiene-1,3 and others and an acrylic nitrile such as acrylonitrile, chloroacrylonitrile, methacrylonitrile, ethacrylonitrile and others. Good results are obtained from copolymers produced by polymerization in aqueous emulsion of a monomeric mixture comprising from 30 to 80% by weight of butadiene-1,3 and from 20 to 70% by weight of acrylonitrile. Other monomeric materials in addition to the butadiene hydrocarbon and acrylic nitrile may be utilized in minor amounts, for example, up to 10 to 15% of the total monomeric mixture, including methyl acrylate, methyl methacrylate, acrylic acid, vinyl benzoate, vinyl pyridine and others. Especially good results are obtained by the use of two component polymers or copolymers, having the requisite softness and low molecular weight, prepared from monomeric mixtures consisting of from 50 to 80% by weight of butadiene-1,3 and from 20 to 50% by weight of acrylonitrile. The best results are obtained with soft, low molecular weight copolymers made by polymerizing in aqueous emulsion substantially two parts by weight of butadiene-1,3 and one part by weight of acrylonitrile.

As mentioned above, the polymers employed as the base material in our new adhesive are distinguished from butadiene acrylonitrile synthetic rubbers by their much greater softness and by their much lower molecular weight. More particularly, these polymeric materials are characterized by possessing a Mooney viscosity (which is a measure of their softness and plasticity), as determined with a standard Mooney viscosimeter using a 1.500 inch rotor after four minutes at 212° F., between 10 and 35, more preferably between 20 and 30. The standard procedure for determining Mooney viscosity on the soft, low molecular weight polymers is set forth in section D-1 of the booklet issued by the R. F. C., Office of Rubber Reserve, and entitled "Specifications for Government Rubbers (Effective January 1, 1946)."

Molecular weight determinations by the cement viscosity method of Staudinger reveal that the copolymers of butadiene-1,3 and acrylonitrile, as usually produced by emulsion polymerization for use as solid oil-resistant synthetic rubbers, have molecular weights considerably above 100,000, usually in the neighborhood of 150,000 or 175,000 or more. Similar molecular weight determinations performed on the soft, low molecular weight materials used in the adhesive of this invention indicate that they exhibit molecular weights generaly well below 100,000, good results being obtained with polymers having molecular weights below 85,000. The molecular weight of the preferred polymers is of the order of 50,000 to 65,000 or lower.

Visual and manual inspection of the low molecular weight polymeric materials for use in the adhesive of this invention reveals that they are soft solids which easily form films when deposited from aqueous dispersion. While they are quite soft and plastic they are not excessively tacky. They do not have the usual snappiness and rebound characteristics of the usual synthetic rubbers and they do not appreciably attain the high strength and other strong elastic properties of ordinary synthetic rubbers upon vulcanization in the usual manner.

The polymers for use in the adhesive of this invention may be produced by various polymerization methods, but are preferably produced by polymerization in aqueous emulsion under conditions adapted to produce a soft, low molecular weight polymer. For example, the polymerization may be effected in aqueous emulsion in the presence of larger amounts than are used in the production of synthetic rubbers, of various sulfur compounds, called modifiers, well known to influence the plasticity of butadiene polymers prepared in their presence. Examples of such modifiers include the aliphatic mercaptans of 4 to 18 carbon atoms such as dodecyl mercaptan and in particular, since they are quite effective, the tertiary alkyl mercaptans, such as tertiary-dodecyl mercaptan and the like, the non-metallic xanthogenates such as diisopropyl xanthogen disulfide and the like, and other well known modifying organic sulfur compounds such as beta-(p-octylphenoxy) beta-mercapto diethyl ether, tetramethyl thiuram disulfide, piperidinium cyclopentamethylene dithiocarbamate, 4-phenyl thiazyl-2-disulfide and others. Another method of producing the low molecular weight polymeric plasticizers of this invention consists in terminating the polymerization reaction when only 30 to 75% or less of the monomers have been converted to the polymeric state. However, the use of larger than normal amounts of polymerization modifiers is the preferred procedure. While for the latter purpose, the precise amount of modifier required depends upon the activity of the particular compound used, from 0.5 to 5% by weight based on the weight of monomers polymerized will generally be found sufficient. Other substances including polymerization terminators such as hydroquinone, di-tertiary amyl hydroquinone and the like, age resistors such as phenyl beta naphthylamine, heptylated diphenylamine and the like, are preferably added to the latex or polymeric dispersion in accordance with the procedures well known to the art.

The rosin alcohol component of our new adhesive may be any of the materials obtained from the reduction of rosin, bivalent metal salts of rosin, esters of rosin or other rosinous materials. The products of such processes usually contain, as principal alcoholic ingredients, varying proportions of dehydroabietyl alcohol, dihydroabietyl alcohol, tetrahydroabietyl alcohol and others along with small amounts of non-alcoholic material. A readily available commercial product which is entirely satisfactory for the purposes of this invention is a colorless, heavy viscous liquid at room temperature, having a saponification number of from 5 to 14, an acid number of from 0.1 to 0.4, a specific gravity of 1.007 to 1.008, and a refractive index of 1.528, and is marketed under the trade name "Abitol." The latter material is a mixture averaging about 15% by weight of non-alcoholic material and the remainder averaging about 15% by weight of dehydroabietyl alcohol, 40% by weight of dihydroabietyl alcohol and 45% of tetrahydroabietyl alcohol.

The amount of rosin alcohol in the adhesive latex may be varied widely depending on the tackiness desired in the final adhesive coating and on the degree of softness and molecular weight of the butadiene acrylic nitrile polymer being utilized. Generally from 2 to 50% by weight based on the polymer of rosin alcohol will produce a wide range of adhesive properties. Good results for general purposes are obtained by the use of from 5 to 25% of rosin alcohol while for the provision of an adhesive coating on wax paper or other foil-like wrapping materials the use of about 10% of rosin alcohol is preferred. Since the rosin alcohols are fairly heavy, viscous oily materials at ordinary temperatures and are not appreciably soluble in water, it is preferred to add the rosin alcohol to the polymer latex or dispersion in the form of an aqueous emulsion. In the production of the latter emulsion, from 0.5 to 5.0% of an emulsifying agent should be utilized including the fatty acid soaps such as potassium oleate, the rosin acid, hydrogenated rosin acid, or disproportionated rosin acid soaps, and the various synthetic saponaceous materials such as the hymolal sulfates, alkaryl sulfonates, and others.

In the production of the adhesive of this invention it is usually preferable to utilize polymeric dispersions containing more than 35% by weight of polymer, more preferably 45 to 55% by weight of polymer, in order to obtain an adhesive coating of sufficient thickness in one or two applications. It may be preferable therefore to concentrate the latex by latex creaming, evaporation, centrifuging and the like before preparation of the adhesive. To the finished latex containing the usual age-resistors, a concentrated emulsion (i. e. 25 to 60%) of rosin alcohol is added preferably along with from 0.5 to 5.0% of added emulsifying or dispersing agent for increased latex stability. The resulting mixed dispersion is gently stirred until it is homogeneous and the adhesive is ready for use.

The adhesive is applied to the desired backing member in any conventional manner such as by spraying, dipping, by roller or brush coating, or by a spreading operation utilizing a roller or doctor knife. The wet latex coating may be dried in any conventional manner such as by drying in air at room temperature, in an air oven, by the application of heated air or infrared radiation and the like. The final sealing operation may likewise be effected by pressure alone, by the application of heat and/or pressure, or by the application of heat derived from radio waves of ultra-high frequency, all as is well understood by the art.

The invention will now be more fully described with reference to several specific examples which demonstrate the preparation of the polymer dispersion, the final latex-like adhesive, and its application to various backing surfaces. The examples are intended to be illustrative only and not as limiting the invention.

*Example 1*

A polymeric latex is prepared by the polymerization at 30° C. of the monomeric materials contained in a reaction mixture having the following composition:

| Material | Parts/Wt. |
|---|---|
| Butadiene | 66.7 |
| Acrylonitrile | 33.3 |
| Emulsifier #1 [1] | 4.6 |
| Emulsifier #2 [2] | 1.0 |
| $K_2S_2O_8$ | 0.3 |
| t-dodecyl mercaptan | 1.0 |
| Water | 190.0 |

[1] A soap believed to be a sodium salt of disproportionated rosin acid and known as "Dresinate 731."
[2] A soap believed to be a sodium salt of a sulfonated naphthalene-aldehyde reaction product and known as "Triton R-100."

The polymerization yields a stable latex of a polymer having a Mooney viscosity, after 4 minutes at 212° F. using the 1.5" rotor, of 21 (the Mooney viscosity using the 1.5" rotor after 4 minutes at 212° F. hereinafter being referred to as ML). The latex is treated first with 0.5% by weight based on the polymer of di-tertiary amyl hydroquinone as a reaction terminator or shortstop and secondly is stabilized with 2.5% based on the polymer of a heptylated diphenylamine age resistor known as "Stalite" added as an aqueous emulsion. The finished latex is then steam stripped under vacuum to remove residual unreacted monomers. The latex which contains 34.9% total solids is finally concentrated to 38 to 40% solids in a disc concentrator.

An emulsion containing approximately 50% rosin alcohol by weight is prepared from the following materials:

| Material | Parts/Wt. |
|---|---|
| Rosin alcohol ("Abitol") [1] | 50.0 |
| Emulsifier [2] | 4.0 |
| Water | 46.0 |

[1] Described hereinabove as containing a mixture of hydroabietyl alcohols.
[2] "Dresinate 731."

The emulsifier is first dissolved in the water and the resulting solution then made alkaline to a pH of 10 to 10.5 by the addition of sodium hydroxide. The soap solution and the alcohol are then combined and twice passed through a colloid mill to form a stable emulsion. Sufficient of the resulting emulsion to constitute 10% by weight based on the polymer is added to the above-prepared latex along with about 0.6% by weight of a rosin acid soap and the resulting mixture gently agitated to insure homogeneity.

The resulting adhesive is applied to the unwaxed side of a waxed paper. The coating is applied using a #20 Meyer coating rod. The latex coating is dried under infra-red lamps. A smooth, shiny, continuous and almost transparent coating is obtained weighing 1.0 lbs./144 sq. yds. and which is not tacky to the touch nor does it adhere to the waxed side of a similarly coated sheet of wax paper. However, when the adhesive coated sides of the two sheets of the paper are pressed together by hand pressure an excellent bond is formed which, however, may be separated without damage to the adhesive coating or to the waxed paper. The adhered-together surfaces may be sealed and resealed about 10 times before the adhesive separates from the backing and transfers to one of the sheets. The latter property is particularly important in the art of food wrapping because the purchaser, for example, of a loaf of wrapped bread may open the package, remove several slices and then reseal the package with hand pressure in order to preserve the freshness of the remainder of the loaf.

The adhesive of Example 1 likewise retains its excellent adhesive powers at temperatures as low as 10 to 30° F. and as high as 120° F. or more and provides excellent, shiny and attractive and tightly adhesive coatings on cellophane, glassine paper, aluminum, lead, and tin-foil, on cardboard coated with wax-rubber compositions, on vinyl resin films and to other familiar packaging materials. The adhesive in all such applications retains its non-tackiness (to hand feel) and its resealability feature. Without the rosin alcohol, the adhesive is tightly adherent to many materials but package seals can not be separated without damage to the base material.

An adhesive prepared in a similar manner from the latex of Example 1 except for the addition of 20% of the rosin alcohol has all the properties of the adhesive prepared with only 10% alcohol and in addition appears to have affinity for glass.

*Example 2*

A latex is prepared in a similar manner except for the substitution for the t-dodecyl mercaptan in the recipe of Example 1 of 2.7 parts of dodecyl mercaptan (primary), the mercaptan being proportioned into the reaction mixture over the course of the reaction. The resulting latex is short-stopped, stabilized, steam stripped under vacuum, and concentrated to 40% total solids. The polymer is found to have a Mooney viscosity of 18 to 28 ML. To separate portions of the latex there are added, respectively, 10%, 8%, 6%, 4% and 2% of emulsified rosin alcohol. The quick-seal properties of all the resulting latices when applied to aluminum foil, glassine paper, and wax paper are excellent and are retained at both high and low temperatures. The coating derived from the adhesive containing 10% of rosin alcohol successfully withstands about 7 reseals before appreciable loss of adhesive powers, with 8% of alcohol about 5 reseals, with 6% 2 or 3 reseals, and with 2 and 4% not more than 2 reseals. By contrast a natural rubber latex adhesive, while it has excellent adhesion to paper, does not have as good quick-seal properties and when two adhered-together coatings are separated the adhesive pulls away from the paper, foil or other backing and pulls out into long "legs" with resultant destruction of the adhesive coating.

In a similar fashion, latices of the copolymers of the foregoing examples, when prepared having a Mooney viscosity of 30 to 35, require relatively larger amounts of rosin alcohol, for example, 15 to 30% by weight based on the polymer to acquire the desirable quick seal and resealability properties. Conversely, with polymers having a Mooney viscosity ranging from 10 to 20 ML relatively smaller amounts are required, for example, 2 to 10%. Adhesives having great tackiness (where the latter property is not undesirable) are obtained when 20 to 50% by weight of rosin alcohol are combined with polymers having Mooney viscosity ranging from 10 to 35.

*Example 3*

A polymer latex prepared by a recipe similar to that of the previous examples from a monomeric mixture consisting of 55% by weight of butadiene and 45% by weight of acrylonitrile, when prepared at a Mooney viscosity of 20 ML and combined with 10 to 20% of a rosin alcohol produce satisfactory adhesives having good quick-seal and resealability properties. Likewise a latex of a soft, low molecular weight tripolymer prepared from a monomeric mixture consisting of 67% by weight of butadiene, 15% by weight of styrene and 18% by weight of acrylonitrile when combined with rosin alcohol according to this invention produces adhesives having the desired properties.

The substitution in the previous examples, for all or part of the butadiene-1,3 of one or more other butadiene-1,3 hydrocarbons such as isoprene, 2,3-dimethyl butadiene and the like and/or the substitution for all or part of the acrylonitrile of another acrylic nitrile such as chloroacrylonitrile, methacrylonitrile and others produces polymer latices which, when combined with a rosin alcohol produce excellent adhesives of wide general applicability both as pressure-sensitive and heat-sensitive compositions.

Other substances may be incorporated in the adhesive composition of this example, for example, natural rubber latex in amounts up to 50% (on a rubber solids basis) may be blended with the adhesive of this invention with highly advantageous results. Other synthetic rubber and resin latices or dispersions, waxes, fillers, stabilizers, thickeners, and the like are highly useful and may be incorporated in the adhesive of this invention.

The adhesive of this invention is of wide general applicability for it evidences adhesive power for all types of papers, whether rough finished such as Kraft paper or whether "slick" finished as in glassine paper, or paper finished with wax, wax-rubber mixtures, or with other mineral and organic materials. The adhesive may also be utilized for rubber-to-metal, paper-to-metal, paper-to-paper or for resin-to-metal adhesion (lamination) where it is desired to separate the adhered together laminae. In addition, the adhesive may be utilized as an adhesive for vinyl chloride resins, for Bakelite resins, melamine resins, and others, as well as for glass, porcelain, ordinary painted surfaces and others.

While we have disclosed certain preferred manners of performing our invention, we do not thereby desire or intend to limit ourselves solely thereto, for the precise proportions of the materials utilized may be varied and equivalent chemical materials may be employed, if desired, without departing from the spirit and scope of the invention as defined by the appended claims.

We claim:

1. An adhesive composition comprising an aqueous dispersion of the polymeric product of a butadiene-1,3 hydrocarbon and an acrylic nitrile, said polymeric product being characterized by possessing a molecular weight below 100,000 and a Mooney viscosity, as determined by means of the Mooney viscosimeter using the 1.5" rotor after 4 minutes at 212° F., between 10 and 35, and dispersed in said aqueous dispersion from 2 to 50% by weight based on the weight of said polymeric product of a rosin alcohol.

2. An adhesive composition comprising an aqueous dispersion of the polymeric product resulting from the polymerization in aqueous dispersion of a monomeric mixture comprising from 30 to 80% by weight of a butadiene-1,3 hydrocarbon and from 20 to 70% by weight of an acrylic nitrile, said polymeric product being characterized by possessing a molecular weight below 100,000 and a Mooney viscosity, as determined by means of the Mooney viscosimeter using the 1.5" rotor after 4 minutes at 212° F., between 10 and 35, and dispersed in said aqueous dispersion from 2 to 50% by weight based on the weight of said polymeric product of a rosin alcohol.

3. An adhesive composition comprising an aqueous dispersion of the copolymer resulting from the polymerization in aqueous emulsion of a monomeric mixture consisting of from 50 to 80% by weight of butadiene-1,3 and from 20 to 50% by weight of acrylonitrile, said copolymer being characterized by possessing a molecular weight below 85,000 and a Mooney viscosity, as determined by means of the Mooney viscosimeter using the 1.5" rotor after 4 minutes at 212° F., between 10 and 35, and dispersed in said aqueous dispersion from 2 to 50% by weight of a rosin alcohol.

4. An adhesive composition comprising an aqueous dispersion of a copolymer prepared by the polymerization in aqueous emulsion of a mixture consisting of 67% by weight of butadiene-1,3 and 33% by weight of acrylonitrile, said copolymer being characterized by possessing a molecular weight below 85,000 and a Mooney viscosity as determined by the Mooney viscosimeter using the 1.5" rotor after 4 minutes at 212° F., between 20 and 30, and from 5 to 25% by weight based on the weight of said copolymer of a rosin alcohol.

ARCH L. HATFIELD.
HAROLD P. OWEN.

No references cited.